(12) United States Patent
Stein et al.

(10) Patent No.: US 12,704,413 B2
(45) Date of Patent: Aug. 11, 2026

(54) SYSTEM WITH THERMOMETER AND CONTAINER FOR CHARGING THE RECHARGEABLE BATTERY OF THE THERMOMETER, AND USE

(71) Applicant: Vorwerk & Co. Interholding GmbH, Wuppertal (DE)

(72) Inventors: Matthias Stein, Mülheim an der Ruhr (DE); Christoph Buggeln, Düsseldorf (DE); Leon Seydel, Wuppertal (DE); Philipp Kielmann, Ratingen (DE)

(73) Assignee: Vorwerk & Co. Interholding GmbH (DE)

( * ) Notice: Subject to any disclaimer, the term of this patent is extended or adjusted under 35 U.S.C. 154(b) by 287 days.

(21) Appl. No.: 18/652,328

(22) Filed: May 1, 2024

(65) Prior Publication Data

US 2024/0369418 A1 Nov. 7, 2024

(30) Foreign Application Priority Data

May 4, 2023 (EP) .................................... 23171518

(51) Int. Cl.
*G01K 1/08* (2021.01)
*G01K 1/024* (2021.01)

(52) U.S. Cl.
CPC ............... *G01K 1/08* (2013.01); *G01K 1/024* (2013.01); *G01K 2215/00* (2013.01)

(58) Field of Classification Search
CPC ...... G01K 1/08; G01K 1/024; G01K 2215/00; G01K 2207/06; G01K 7/02; G01K 7/22; G01J 5/00; G01J 5/028; G01J 5/04; H01M 10/44; H02J 7/70; H02J 50/00; H02J 50/005; H02J 50/10; H02J 7/60
USPC .......................................................... 374/100
See application file for complete search history.

(56) References Cited

U.S. PATENT DOCUMENTS

| | | | | |
|---|---|---|---|---|
| D753,450 | S * | 4/2016 | Lessel | D7/688 |
| 2003/0146360 | A1 * | 8/2003 | Steinmetz | F16B 9/054 374/E11.013 |
| 2007/0067118 | A1 * | 3/2007 | Cooper | H02J 7/70 702/57 |
| 2020/0096393 | A1 * | 3/2020 | Lion | G01K 3/10 |

FOREIGN PATENT DOCUMENTS

| | | | |
|---|---|---|---|
| CN | 207717236 | U | 8/2018 |
| CN | 114526826 | A | 5/2022 |
| WO | 2013145542 | A1 | 10/2013 |

* cited by examiner

*Primary Examiner* — Peter J Macchiarolo
*Assistant Examiner* — Mireille S Sadate-Moualeu
(74) *Attorney, Agent, or Firm* — Barnes & Thornburg

(57) ABSTRACT

The present disclosure relates to a system comprising a thermometer, a rechargeable battery in the thermometer, a container for the thermometer, and a lid for closing the container, wherein the container comprises a charging device for charging the rechargeable battery, characterized in that the lid comprises a holding device for holding the thermometer and by closing the lid the thermometer is connected to the charging device for charging the rechargeable battery when the thermometer is held by the lid. The present disclosure further relates to a use of a thermometer holder for the system.

20 Claims, 19 Drawing Sheets

Figures 1, 2:
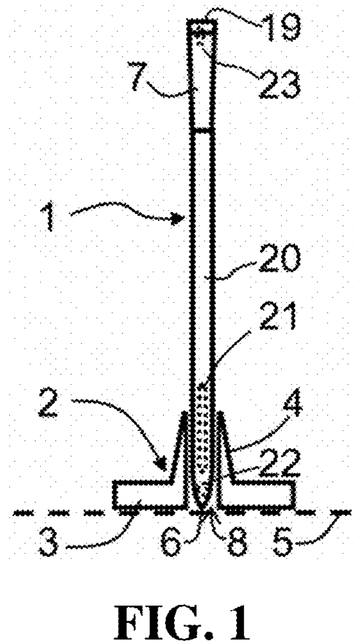

SYSTEM WITH THERMOMETER AND CONTAINER FOR CHARGING THE RECHARGEABLE BATTERY OF THE THERMOMETER, AND USE

PRIORITY CLAIM

This application claims priority to European Patent Application No. 23171518.6, filed May 4, 2023, which is expressly incorporated by reference herein.

FIELD OF THE DISCLOSURE

The present disclosure relates to a system with an electrically operated thermometer. The present disclosure also relates to a use for the system.

The thermometer may comprise a battery for its operation. The battery may be rechargeable, i.e., a rechargeable battery. The thermometer may comprise another rechargeable energy storage device. If the rechargeable energy storage device can be recharged, a charging device is required to enable recharging.

BACKGROUND

The unpublished European patent application with the official file number 21214995.9 describes a system with an electrically operated thermometer and a charging device with which the rechargeable battery of the thermometer can be recharged. It also describes a container in which the thermometer can be stored. The container comprises a charging device for charging the rechargeable battery.

The aim of the present disclosure is to further develop a system with a thermometer.

SUMMARY

The system of the present disclosure comprises a thermometer and a battery, in particular a rechargeable battery, for operating the thermometer. Instead of a rechargeable battery, however, another electrically rechargeable energy storage device can also be provided. The system may comprise a container for the thermometer. The system may comprise a lid for closing the container. The container may comprise a charging device for charging the rechargeable energy storage device. The lid may comprise a holding device for holding the thermometer.

The thermometer is a measuring device that is used to measure the temperature.

The thermometer may comprise a temperature sensor and a scale or display to indicate a measured temperature. Alternatively or additionally, measured temperatures may be transmitted from the thermometer to another device. The other device can display and/or process transmitted temperatures, for example, to control the operation of a device depending on measured temperatures, for example. The transmission can take place via an electrically conductive connection or wirelessly via radio, for example via Bluetooth, Thread or Wi-Fi.

Various types of thermometers may be provided, including:

- Digital thermometer: A digital thermometer may comprise and use one or more sensors such as thermistors to measure temperature. A measured temperature can be displayed on a digital display.
- Infrared thermometer: An infrared thermometer uses infrared rays to measure the surface temperature of objects without direct contact. An infrared thermometer is useful for measuring the temperature of hot or hard-to-reach objects.
- Thermocouple: This is based on the principle of the Seebeck effect and uses two different metals connected at one end to convert a temperature difference into an electrical voltage.

The thermometer may comprise a housing in which, among other things, at least one temperature sensor, electronics for operating the thermometer, and a battery may be located. A radio device may be present in the housing. The radio device can send measured values and/or receive data. The housing may consist of materials such as metal, plastic, ceramic and/or rubber.

The battery is an electrochemical device that stores electrical energy and dispenses it in the form of direct current when required. A typical battery consists of one or more galvanic cells that are connected to each other and together generate electrical energy.

Different types of batteries are possible, including alkaline batteries, lead-acid batteries, lithium-ion batteries, nickel-cadmium batteries, nickel-metal hydride batteries and many others.

A rechargeable battery is a battery that can be recharged after discharge and is therefore reusable. Unlike disposable batteries, which must be disposed of after discharge, rechargeable batteries can be recharged by connecting them to an external power source to restore their energy capacity and use them again.

There are different types of rechargeable batteries, including nickel-cadmium (NiCd), nickel-metal hydride (NiMH), lithium-ion (Li-Ion) and lithium-polymer (Li—Po).

The container is a vessel for holding, storing and/or transporting the thermometer. The container comprises a bottom or base and side walls or a surrounding side wall. The container may be produced from materials such as plastic, glass, metal and/or wood. The bottom and/or the one or more side walls of the container may be closed to provide particularly good protection against contamination, for example. The bottom and/or the one or more side walls of the container may have openings, for example for ventilation purposes.

The lid is a cover or closure device that serves to completely or partially close or cover the opening of the container. The lid can, for example, be placed over the opening of the container. The lid can be produced from materials such as plastic, metal, glass and/or wood. The lid, including a holding device, is preferably produced in one piece by injection molding. The lid may be flat or curved. The lid may be shaped like a hood. The lid may be arc-shaped in section.

The lid can be used to protect the thermometer in the container from external influences, such as dirt, dust, moisture or contamination.

The lid may be a pushing lid: a pushing lid can then be opened and closed by pushing or clicking. The pressure lid may be completely separated from the container.

The lid can be a hinged lid. The hinged lid comprises a hinged mechanism. The hinged lid can be opened or closed by lifting or pressing down the hinged lid on one side to pivot it. A hinged lid can be permanently connected to the container and thus cannot be lost.

The charging device is a device that is used to feed electrical energy into the rechargeable battery or another rechargeable energy storage device of the thermometer.

The charging device may comprise its own power source and/or be connected to an external power source via an electrical cable. The charging device may comprise a battery or a rechargeable battery as its own power source. The battery or rechargeable battery may be present in a battery compartment. There may be a lid for the battery compartment so that the battery or rechargeable battery can be replaced.

The charging device can be connected to the rechargeable energy storage device of the thermometer for charging. This can be done via electrical conductors or inductively. The charging device may comprise a control unit that monitors and/or regulates a charging process to ensure that the rechargeable energy storage device is charged safely and efficiently. The charging device may have protective functions such as overcharge protection, short-circuit protection, temperature monitoring and/or automatic shutdown functions to ensure the safety and service life of the rechargeable energy storage device.

The holding device of the lid is a device used to hold and/or secure the thermometer in a temporary position on the lid.

The holding device of the lid is or may comprise, for example:

- Clamp, clip, bracket that can be used to hold the thermometer to the lid by pressure and/or friction and/or form fit. They can be produced from materials such as metal, plastic or rubber.
- Belt or strap that can be used to secure or fix the thermometer. Belts or straps are often produced from textiles or other flexible materials.
- Recess into which the thermometer can be placed. The recess can be such that it can hold an inserted thermometer by clamping action.
- Latching element that can hold the thermometer by a latching effect.

The system may be configured such that by closing the lid to the container, the thermometer is connected to the charging device for charging the rechargeable energy storage device when the thermometer is held by the lid and/or by the holding device of the lid. If the lid has been closed, the thermometer may have been brought into the vicinity of a coil, for example. The thermometer can then be inductively charged via the coil. If the lid has been closed, the thermometer may have been electrically connected to electrical contacts, for example. The thermometer can then be inductively charged via the electrical contacts. Conversely, opening the lid can end or interrupt charging.

The container may comprise a fastening device with which the thermometer and thus also the lid can be held when the lid has been closed. The fastening device may be a magnet or comprise a magnet to hold the thermometer magnetically. The fastening device may comprise a latching lever into which the thermometer can be latched. The fastening device may be a clip into which the thermometer can be pressed by closing the lid.

The fastening device may be such that a sufficiently large force is sufficient to open the lid. The force may be greater than the sum of the weight forces of the thermometer and the lid. A lid cannot then come loose due to gravity alone.

The fastening device of the container and the holding device of the lid may be configured such that the thermometer in the container only detaches from the fastening device when the lid is opened.

A first charging contact of the charging device may be or comprise the fastening device of the container. By closing the lid, the thermometer can then be connected to the charging contact in such a way that the lid can be held in its closed position after closing. On the one hand, the thermometer can be connected to the electrical contact particularly reliably by fastening it. On the other hand, the lid can be held in its closed position by fastening.

The fastening device of the container may be or comprise a latching device into which the thermometer latches when the thermometer is charged in the container. The latching device may be such that the charging contact permanently rests (is permanently pressed) against the thermometer to ensure a particularly reliable electrical connection. The latching device may be a hook or a tab with a protrusion protruding from the lid or comprise a hook and/or a tab with a protrusion protruding from the lid. By closing the lid, a part of the thermometer can snap into place and then be held by the hook or protrusion. The latching device is basically such that it can be released by opening the lid with sufficient force.

The fastening device of the container may be or comprise a clip. The clip may comprise two legs that can be elastically bent apart. A clip is particularly suitable for producing an electrical connection to the thermometer for charging. By providing a clip, fault tolerances can be compensated for particularly easily in order to hold the thermometer in the closed state of the lid such that the lid can be held in its closed position. If the lid is held in its closed position, the lid cannot move to its open position by gravity due to its own weight plus the weight of the thermometer. A sufficiently large force can therefore be applied, which can be greater than the weight of the lid and the thermometer.

So that the clip can also be a charging contact, it consists entirely or at least partially of an electrically conductive, elastically flexible material. The clip may consist entirely or partially of a preferably stainless metal. The clip may be made from a sheet metal, for example a steel sheet.

A second loading contact of the container may be or comprise a spring. By closing the lid with the thermometer inside, the spring can be biased (preloaded) by the thermometer, for example. As a result, an electrical connection to the thermometer can be reliably maintained in order to be able to charge. The spring can be made of sheet metal, for example sheet steel.

The spring may rest against one end of the thermometer when the thermometer is in the container and is being charged, if necessary. This can help to ensure that the thermometer is advantageously held securely in place inside the container.

The thermometer may be pin-shaped so that it can be pierced (inserted) into a foodstuff to measure the temperature, for example. The thermometer may comprise a metal casing in order to be able to conduct heat well to a temperature sensor of the thermometer. The casing consisting of metal may be electrically conductively connected to the rechargeable energy storage device of the thermometer in order to be able to charge the rechargeable energy storage device by connecting the outer casing to the charging device. The electrically conductive outer casing may be electrically separated from an end piece consisting of metal by means of a handle part. The handle part can be electrically connected to the rechargeable energy storage device in order to be able to charge the rechargeable energy storage device by connecting the end piece to the charging device. The casing and the end piece can therefore be charging contacts for charging the rechargeable energy storage device of the thermometer if the casing and end piece consist of an electrically conductive material and are suitably electrically connected to the rechargeable energy storage device.

The holding device of the lid may comprise a slot (insert) into which the thermometer can be pushed (inserted) for holding the thermometer. The slot may be formed by one or more clips, which may be shaped such that the thermometer can be pushed into them. The slot can be such that the thermometer cannot be moved out of the slot perpendicular to the inserting direction. This can prevent the thermometer from unintentionally detaching from the lid when the lid is opened. An end face of the slot may be open and the opposite end face may be closed in order to be able to hold the thermometer on the lid properly. The slot may be shorter than the thermometer so that charging contacts of the thermometer remain accessible for charging. The slot may have openings and/or interruptions so that the charging contacts of the thermometer remain accessible for charging. The slot may be formed by walls with openings. The thermometer can then be pushed through the holes.

The slot may be aligned such that the thermometer can be pushed into the slot parallel to the lid. The diameter of the slot can be adapted to the diameter of the thermometer in such a way that the thermometer reliably detaches from the fastening device of the container when the lid is opened.

The thermometer may comprise a tip. The container may comprise a recess adapted to the tip or the slot may have a sufficiently closed end adapted to the tip. It can thus be achieved that the thermometer can only be stored in the container if the tip extends into the adapted recess and/or into the closed end. This can be advantageous for reliable charging.

The lid may be pivotably connected to the container. A leverage effect can then be utilized so that the thermometer can be detached from the fastening device, for example from the mentioned clip, with little effort. The lid can be elongated and pivotably mounted at an end face. A leverage effect can then be utilized particularly well in order to be able to open the lid with particularly little effort.

The container and/or the thermometer may comprise a magnet for holding the container and/or the thermometer on a surface consisting of ferroelectric material.

The length of the lid may correspond to the length of the thermometer in order to keep the installation space to a minimum.

The container may have a flat back and/or base, which is preferably opposite the lid. The container can then be placed in a stable position. Nubs may protrude from the flat side. The container can then be placed stably on the nubs. The nubs may consist of an elastic material such as an elastomer in order to be able to place the container reliably and without slipping.

The system may comprise a thermometer holder, preferably consisting of an elastomer, for holding the thermometer when the thermometer is used for a temperature measurement. The thermometer holder can be held by the container and removed from the container when required.

The container may comprise a recess into which the thermometer holder can be inserted. Preferably, the recess is arranged on an end face. The thermometer holder may be held in the recess in a force-fit and/or form-fit manner. The thermometer holder may be held in the holder by a screw or bayonet connection. For example, the recess may have an internal thread and the thermometer holder may have an associated external thread. The thermometer holder can be held in the recess by a magnetic connection.

When inserted, a part of the thermometer holder may protrude from the recess in such a way that the part of the thermometer holder can be gripped and the thermometer holder can be pulled out of the recess. The part of the thermometer holder can be a foot.

One or more elements such as web (bar), plate and/or ribs may be present within the recess for holding and/or aligning the thermometer holder. For example, when the thermometer holder is inserted into the recess, a web present within the recess may be embraced by a slit of the thermometer holder for holding and/or aligning. The web is then located inside the slit. The web may extend from one side of the recess to an opposite side of the recess. The slit can be shaped and embrace the web in such a way that the thermometer holder can be held positively when the thermometer holder is inserted into the recess.

The web can be straight or arc-shaped. The course of the slit is correspondingly straight or arc-shaped. A differently shaped element may be provided instead of the web. Instead of the slit, the thermometer holder can then have the shape of a recess that is adapted to the differently shaped element in order to provide an insertion orientation.

The thermometer holder may comprise at least one thermometer holding device by which the thermometer can be held in a holding position. The thermometer holder may comprise two different thermometer holding devices, by means of which the food thermometer can be held in two different holding positions.

A thermometer holding device of the thermometer holder may be designed like a holding device of the lid. A thermometer holding device of the thermometer holder may be a passage through which one end of the thermometer can be inserted (pushed through) for holding.

The thermometer holder may comprise a foot for setting up the thermometer holder on a flat surface. The foot may be such that it closes the recess of the container when the thermometer holder is inserted into the recess.

The foot of the thermometer holder may comprise at least one thermometer holding device for holding the food thermometer.

The foot may have a straight edge on the side so that the foot can be supported on the straight edge. The thermometer can then be held by the thermometer holder and inserted into a food product, for example. The straight edge may be adapted to the base of the container so that the straight edge runs parallel to the container base and/or adjacent to the container base when the thermometer holder is inserted into the recess.

A neck may protrude from the foot which neck extends into the recess of the container when the thermometer holder is held by the container.

The neck may comprise a slit and/or a blind hole. Slit and/or blind hole may be thermometer holding devices with which the thermometer can be held in desired positions.

The present disclosure also relates to the previously described thermometer independent of the container. The thermometer may be pin-shaped. The thermometer may comprise a casing consisting of metal. The thermometer may comprise a handle part electrically separated (insulated) from the casing by an end piece consisting of metal. The thermometer may comprise a rechargeable energy storage device such as a rechargeable battery. The casing and the end piece may be charging contacts for charging the rechargeable energy storage device.

The present disclosure also relates to a thermometer holder independent of the container described above. The thermometer holder can be as described above. The thermometer holder may be adapted to the recess in the container in such a way that the thermometer holder can be inserted into the recess of the container.

The thermometer is preferably a food thermometer. A food thermometer is a temperature measuring device that is intended and suitable for measuring temperatures in a food or foodstuff during its preparation. A food thermometer can therefore measure temperatures that may occur during the preparation of food. Temperatures that deviate significantly from this cannot be measured. In addition, a food thermometer can withstand the environmental conditions that can occur during the preparation of food.

As a general rule, temperatures of less than 200° C. are reached when preparing a food. However, temperatures of 350° C. can also be reached, for example for baking a pizza. Temperatures of more than 350° C. are generally not exceeded. A food thermometer in the sense of the present disclosure is therefore configured such that temperatures above 400° C., preferably above 300° C., particularly preferably above 250° C., can no longer be measured. In principle, the food thermometer is configured such that this can be used in a conventional baking oven, i.e., at temperatures of up to 250° C. or 220° C.

A food thermometer in the sense of the present disclosure is not designed to be able to measure very low temperatures such as, for example, temperatures significantly below subzero temperatures as are reached in household freezers. Thus, a food thermometer in the sense of the present disclosure is not designed to measure temperatures lower than −70° C. In principle, a food thermometer in the sense of the present disclosure is designed so that it cannot measure temperatures below-50° C. because food is generally produced with a supply of heat and very low temperatures are only applied for freezing a food.

A food thermometer in the sense of the present disclosure can withstand a steam atmosphere. A food thermometer is therefore generally encapsulated in a waterproof manner. A food thermometer in the sense of the present disclosure is resistant to common ingredients of a food, such as acid of lemons or vinegar.

A food thermometer may be intended and suitable to be pierced (inserted) into a food to be able to measure a temperature inside the food. For this purpose, a food thermometer may comprise an elongated probe having a pointed end or at least a very thin end to enable the probe to be pierced into relatively solid nourishment such as meat. The probe comprises a sensor by means of which a temperature can be measured. A food thermometer may comprise a handle part that is not intended to be inserted into the food. The handle part may be grasped by a user to allow the food thermometer to be withdrawn (removed) from a nourishment or food. The handle part may also comprise a sensor by means of which a temperature can be measured. The surrounding temperature outside a nourishment or food can then also be measured.

The present disclosure also relates to a container for charging the thermometer, independently of the thermometer and/or the thermometer holder. The container may be as described above and configured for charging a thermometer.

The present disclosure also relates to the use of a thermometer holder for, for example, vertically setting up the container with the thermometer therein. The thermometer holder can be connected to the container of the system. For the connection, the thermometer holder can, for example, be inserted into an end-face recess of the container. The container can then be placed on the thermometer holder. The container can then be set up vertically on one end face, for example. The thermometer holder can improve the setting up, for example to dampen noise and/or improve slip resistance. The thermometer holder can consist of a material that is able to do this. The material of the thermometer holder can therefore be more flexible and/or more slip-resistant than the material of the container.

The thermometer holder provided for the use may be as described above. In particular, the thermometer holder provided for use may comprise at least one thermometer holding device for holding the thermometer or two different thermometer holding devices by which the thermometer can be held in two different holding positions. The thermometer holder may comprise a foot and a neck protruding from the foot. There may be a slit in the neck. The foot may comprise a lateral edge. The slit may form a right angle with this edge.

BRIEF DESCRIPTIONS OF THE DRAWINGS

The figures show

Figure 3:
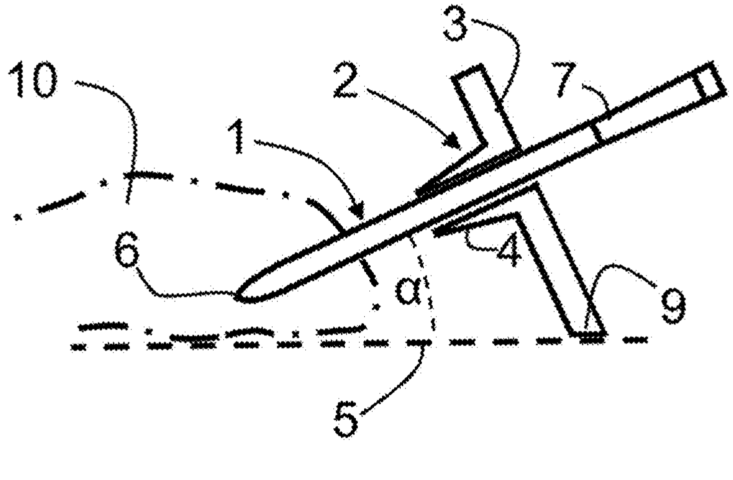
Figure 4:
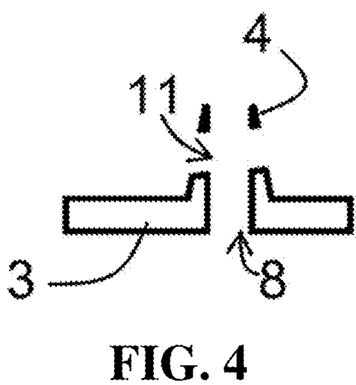
Figure 5:
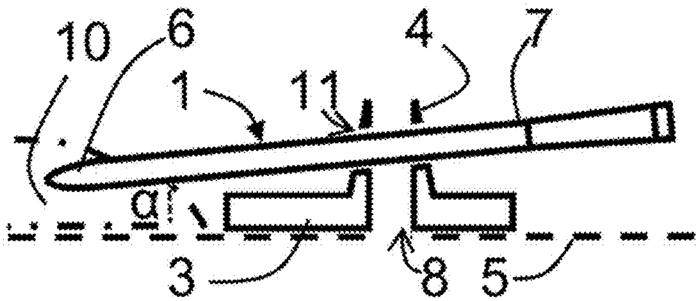
Figure 6:
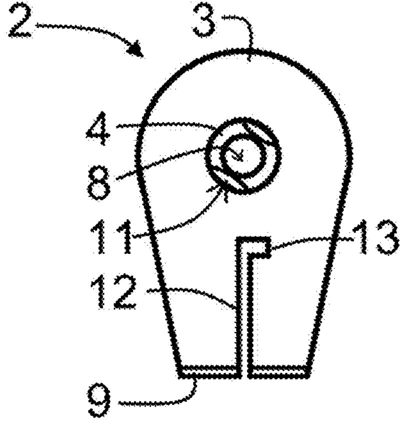
Figures 7, 8:
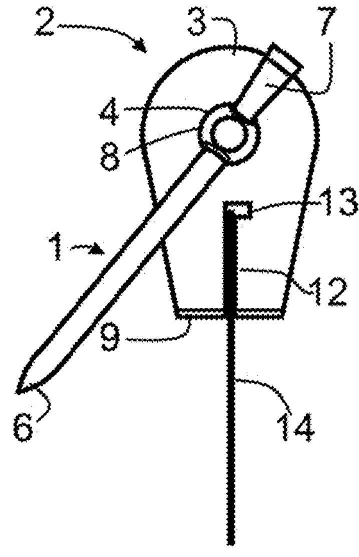
Figure 9:
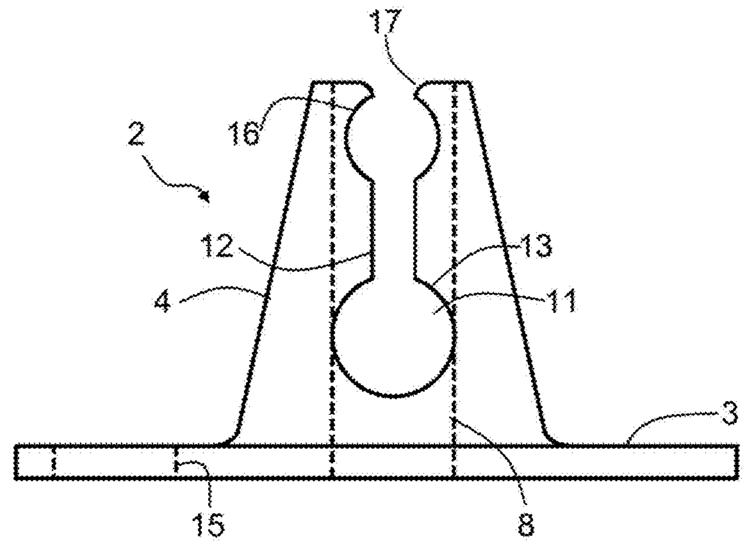
Figure 10:
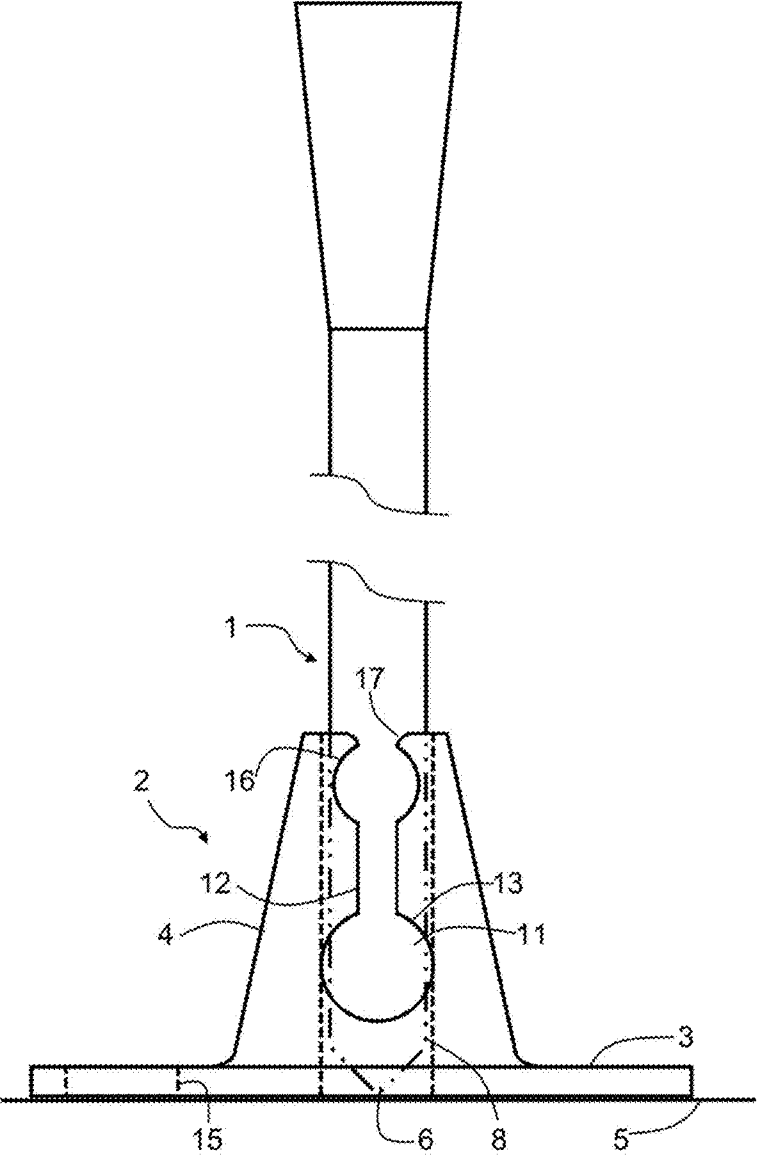
Figure 11:
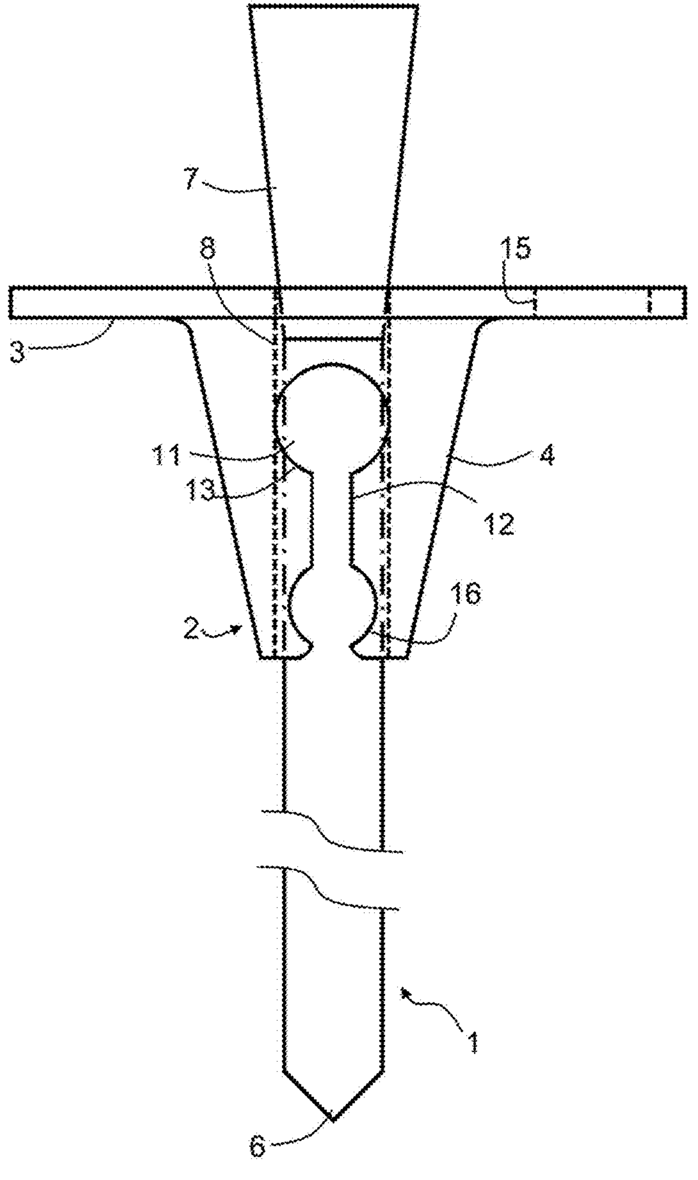
Figure 12:
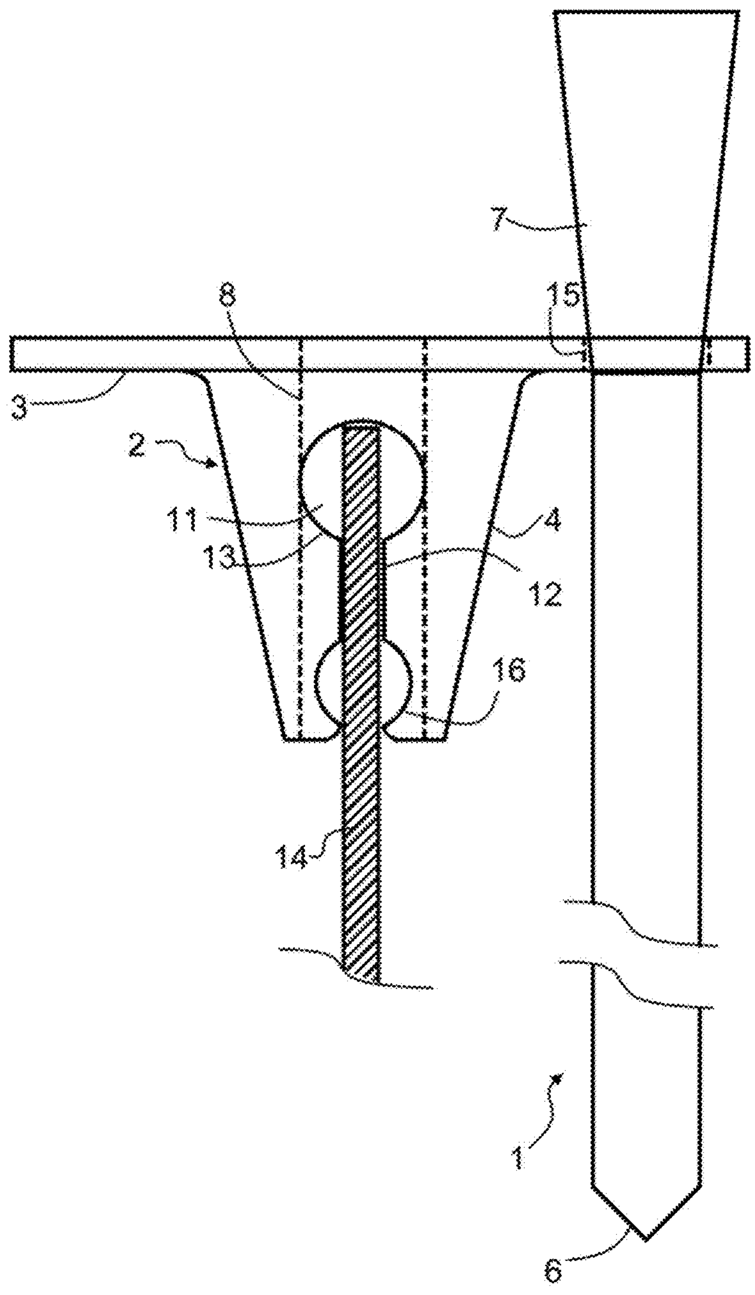
Figure 13:
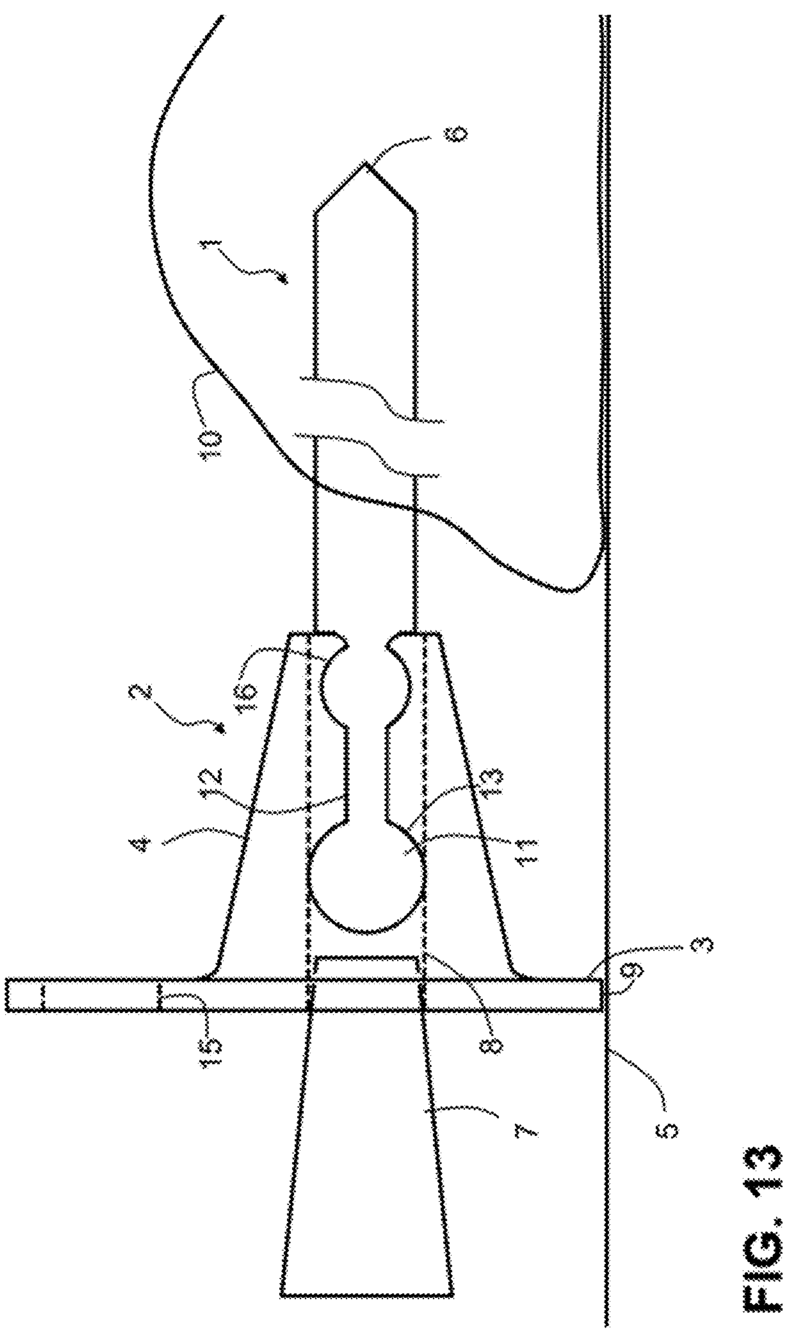
Figure 14:
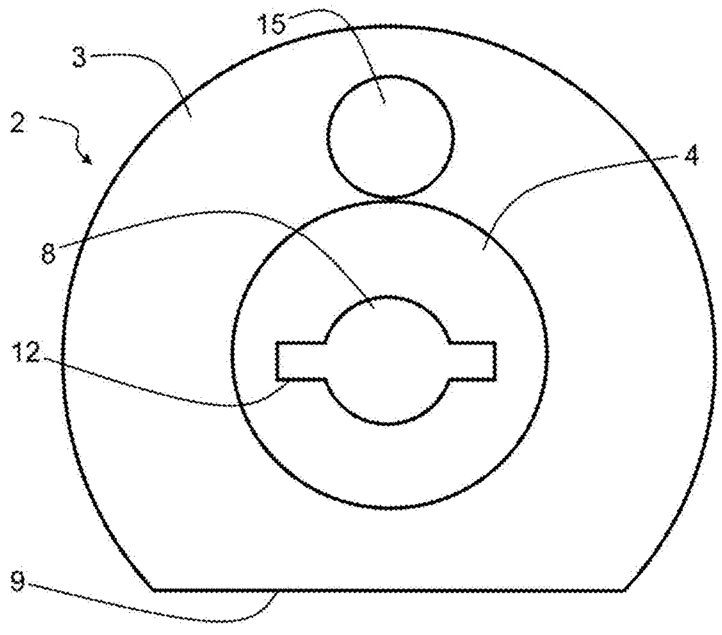
Figure 15:
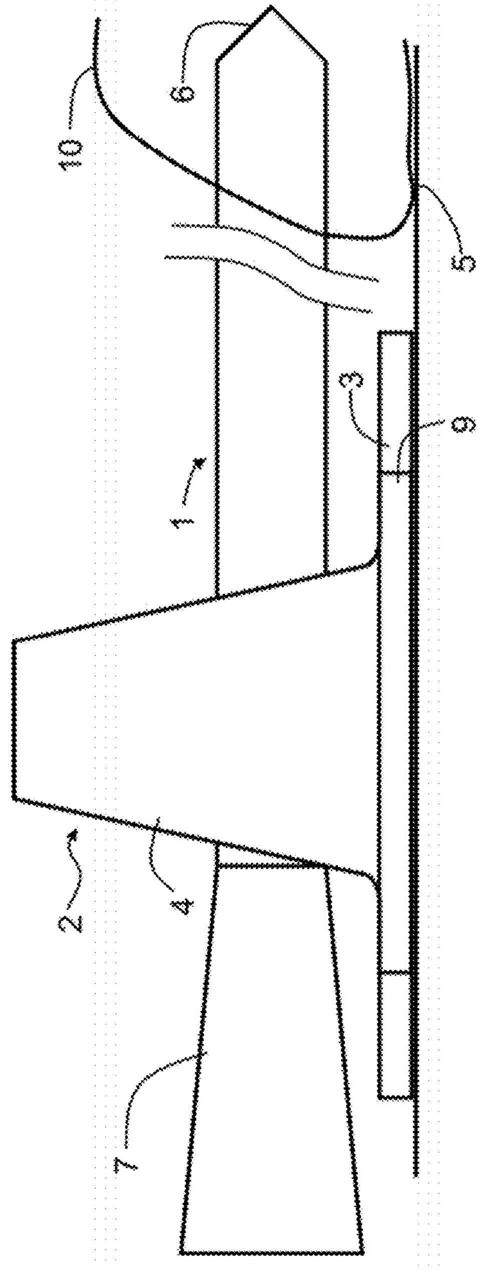
Figure 16:
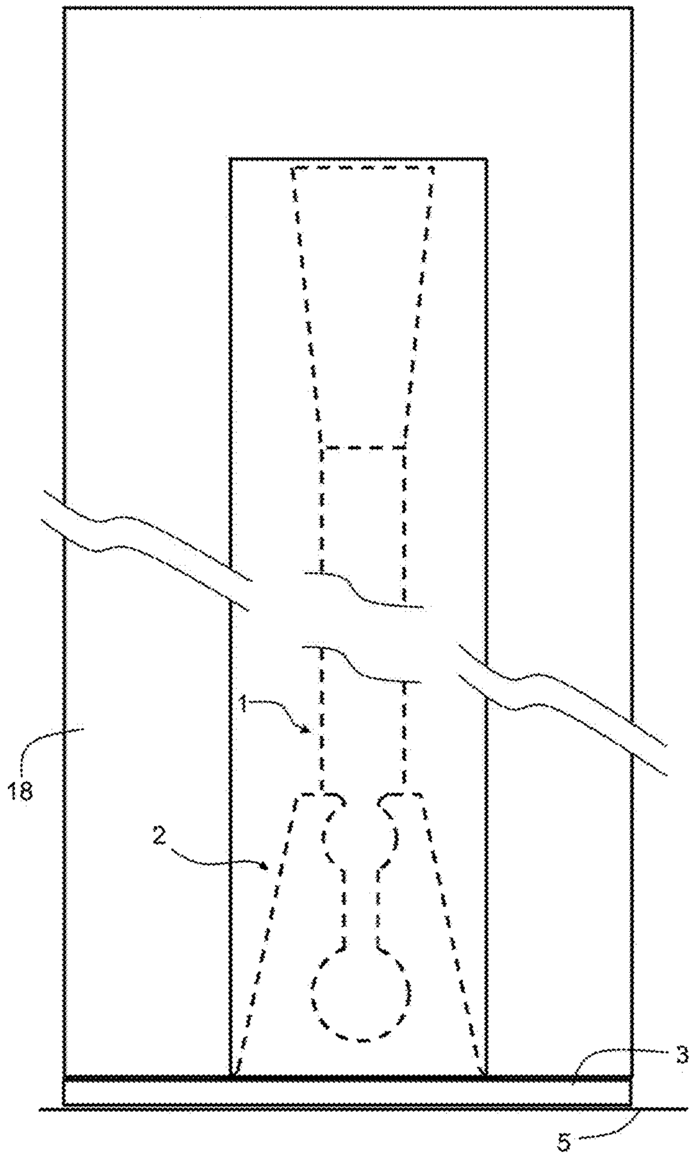
Figures 17, 18:
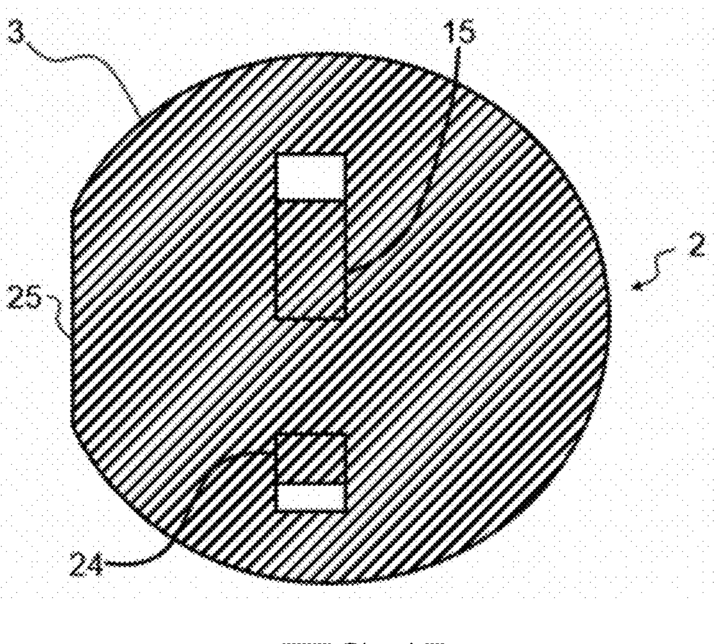
Figure 19:
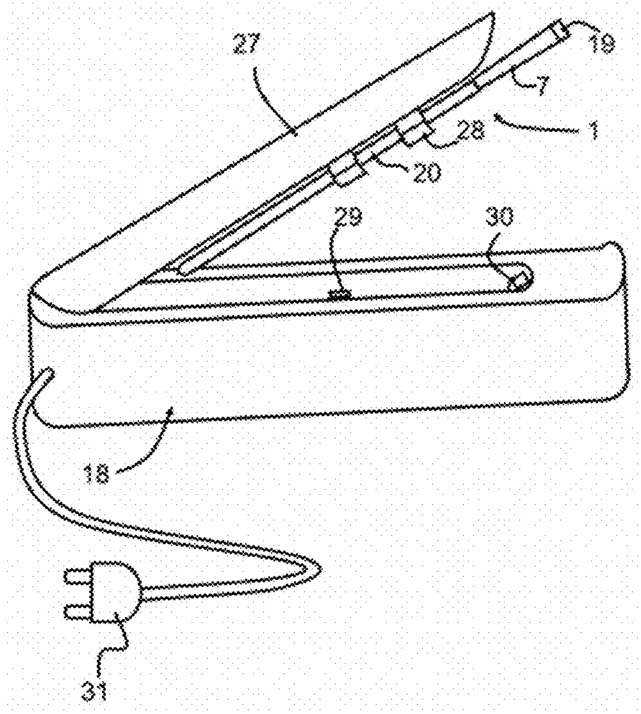
Figure 20:
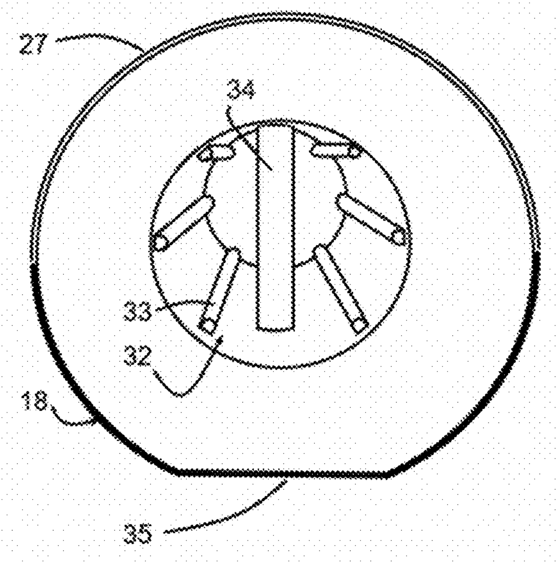
Figure 21:
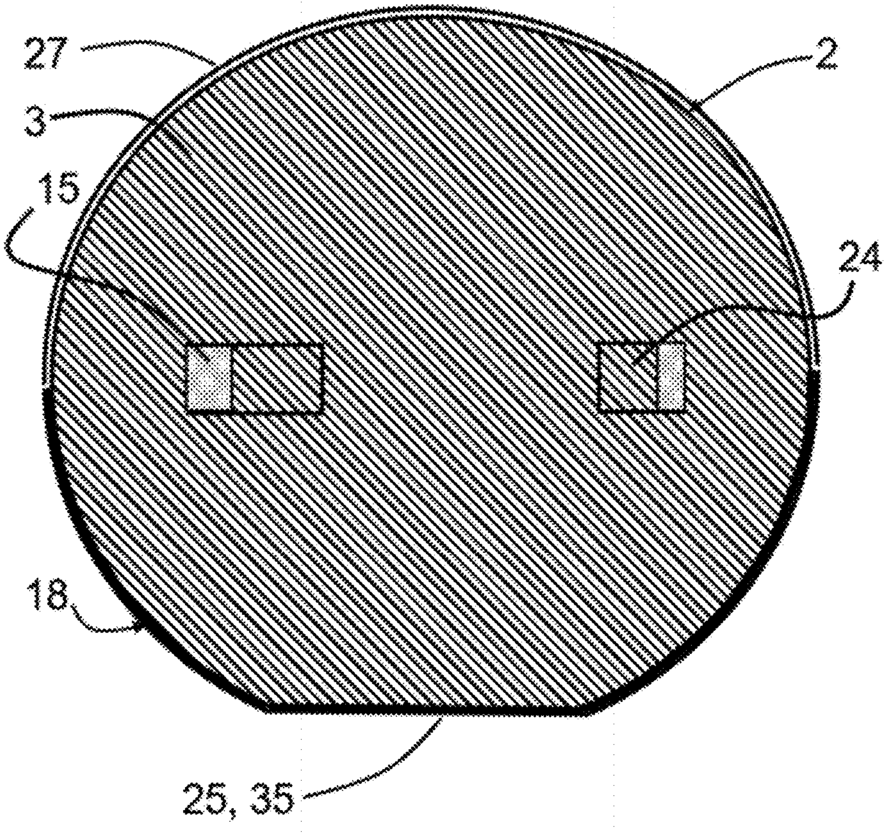
Figure 22:
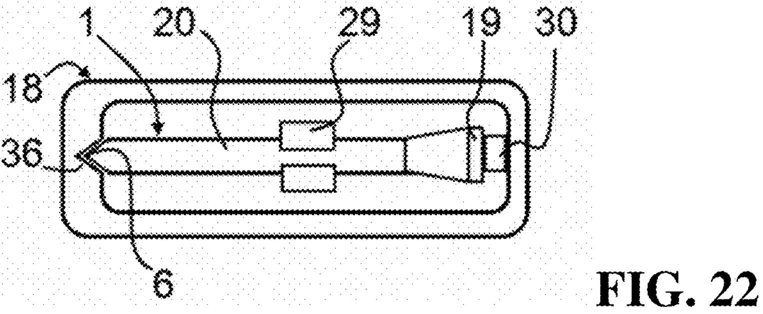
Figure 23:
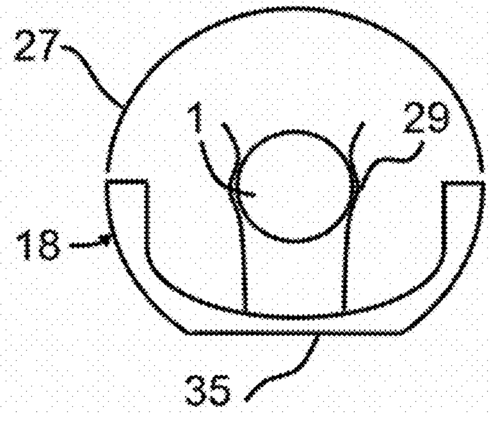
Figure 24:
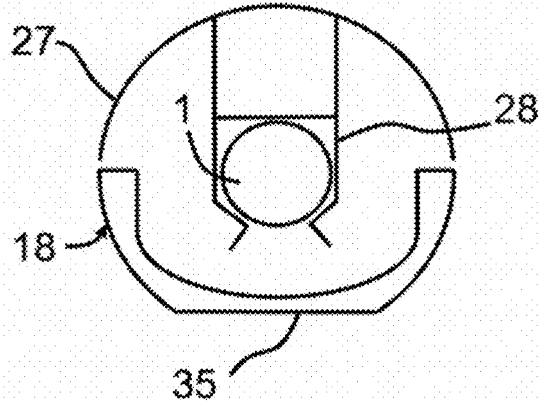
Figure 25:
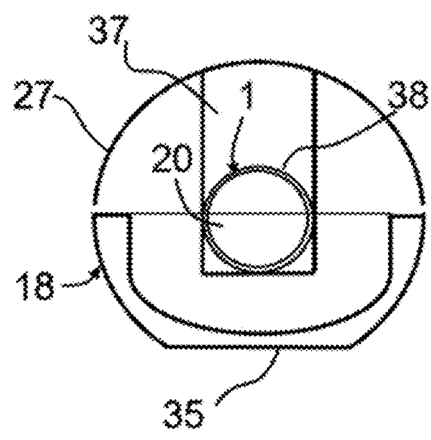
Figure 26:
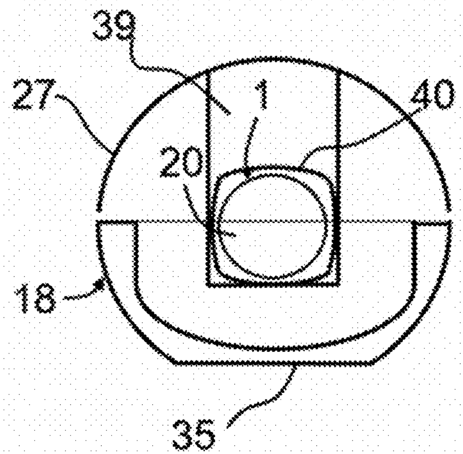
Figure 27:
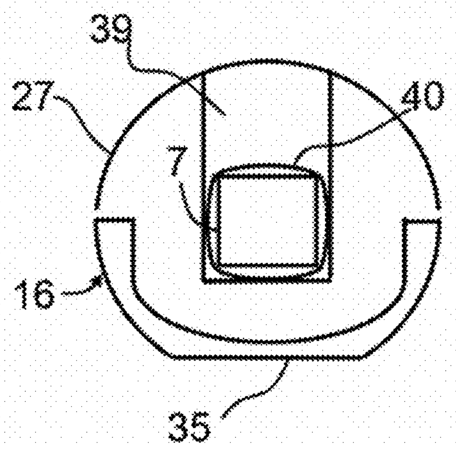
Figure 28:
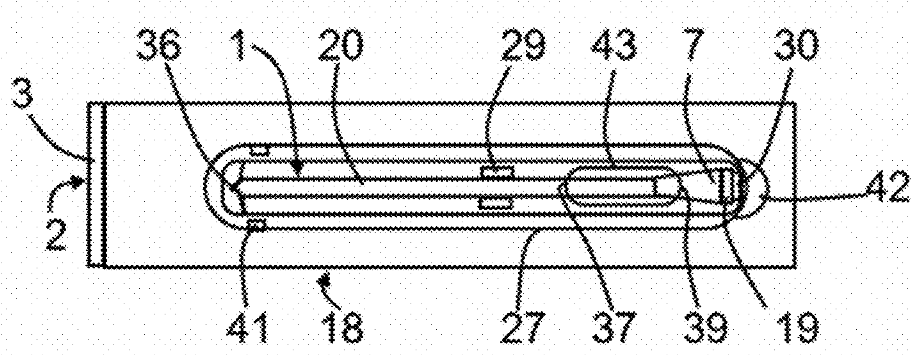
Figure 29:
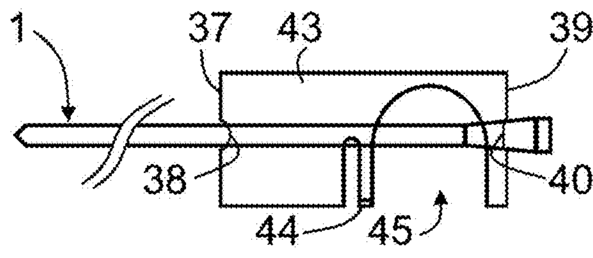
Figure 30:
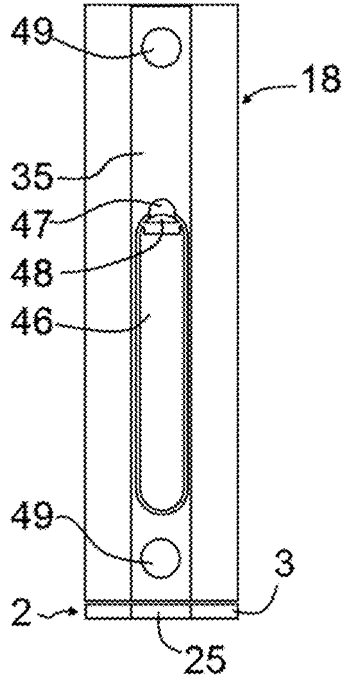

FIG. 1: Section through a system with a food thermometer and a thermometer holder;

FIG. 2: View of the system rotated by 90° compared to FIG. 1;

FIG. 3: System with thermometer inserted into a food from above;

FIG. 4: View of the system rotated by approx. 70° compared to FIG. 1;

FIG. 5: System with thermometer inserted into a food from the side;

FIG. 6: Top view of thermometer holder;

FIG. 7: Top view of thermometer holder with thermometer and attachment to vessel wall;

FIG. 8: Three-dimensional representation of a second configuration;

FIG. 9: Schematic side view of a third configuration;

FIG. 10: Holder from FIG. 9 with thermometer upright;

FIG. 11: System with thermometer holder serving as a handle;

FIG. 12: System with thermometer holder attached to a vessel wall;

FIG. 13: System with thermometer inserted into the side of a food;

FIG. 14: Top view of thermometer holder from FIG. 13;

FIG. 15: System with thermometer inserted into the side of a food;

FIG. 16: System with cylindrical container;

FIG. 17: Base of a thermometer holder;

FIG. 18: Top view of thermometer holder;

FIG. 19: Container for charging;

FIG. 20: End-face view of the container;

FIG. 21: End-face view of the container with inserted thermometer holder;

FIG. 22: Top view of container;

FIG. 23: Section through container;

FIG. 24: Section through container;

FIG. 25: Section through further container;

FIG. 26: Section through further container;

FIG. 27: Section through further container;

FIG. 28: Top view of another container;

FIG. 29: View of walls for holding a thermometer on the lid;

FIG. 30: Vertical setting up of a system with container.

DETAILED DESCRIPTION

FIG. 1 shows a section through a thermometer, which may be a food thermometer 1. A thermometer holder 2 for holding the thermometer 1 is also shown. The thermometer holder 2, which may consist of an elastomer, for example, may comprise a foot 3 and a neck 4. If the foot 3 stands on a horizontal, flat surface 5, then the neck 4 protrudes upwards from the foot 3. The neck 4 can taper upwards. The neck 4 may then protrude vertically upwards.

The thermometer 1 may be pin-shaped. The thermometer 1 may have a tip 6 at one end so that it can be pierced (inserted) into a food product. The thermometer 1 may have a handle 7 at the other end. The handle 7 may be conical. The handle 7 may widen continuously or discontinuously towards the end. With the exception of the handle 7, the housing of the thermometer 1 can consist of an electrically conductive material such as metal. The handle 7 may consist of an electrically insulating material to electrically separate the electrically conductive end piece 19 of the housing from the electrically conductive casing 20 of the housing. The handle 7 preferably consists of a heat-resistant plastic. A rechargeable battery 21 can be present inside the housing, which can be arranged, for example, to prevent overheating at the tip 6 or inside the handle 7. The rechargeable battery 21 can be electrically connected to the end piece 19 and the casing 20 in such a way that the rechargeable battery 21 can be charged via the end piece 19 and the casing 20.

A temperature sensor 22 may be located inside the tip 6 or immediately adjacent to the tip 6 of the thermometer 1. If the tip 6 of the thermometer 1 is inserted into a foodstuff, the temperature prevailing in the foodstuff can be measured. A further temperature sensor 23 may be located approximately in the middle of the thermometer 1 or adjacent to the end piece 19 so that a second temperature can be measured outside a foodstuff. The thermometer 1 may have electronics that can be used to evaluate a signal from a temperature sensor. The thermometer 1 may comprise a transmitting device with which a temperature signal can be sent wirelessly to a receiving device.

The tip 6 may be an end inserted into a passage 8 of the thermometer holder 2. The tip 6 may rest (lie) on the surface 5. In the set-up state of the thermometer holder 2 shown in FIG. 1, the thermometer 1 may protrude vertically or essentially vertically from the horizontal surface 5, for example. The thermometer 1 and thermometer holder 2 can thus be kept ready or parked in a space-saving manner. The passage 8 is a thermometer holding device of the thermometer holder 2 in order to be able to hold the thermometer 1 in a desired position. The tip 6 can therefore also be inserted through the passage 8.

FIG. 1 shows that, in the view shown, the width of the foot 3 may be greater than the height of the thermometer holder 2. Seen from the neck 4, the foot 3 may protrude equally far to the left and to the right. In this view, the passage 8 thus passes through the center of the foot 3. The diameter of the passage 8 can be such that the handle 7 cannot be pushed through the passage 8 or cannot be pushed through it completely. In this embodiment in particular, the thermometer holder can also be used to easily remove the thermometer 1 from a food product. The thermometer holder 2 therefore preferably consists of a material with poor thermal conductivity compared to metal, such as an elastomer or another plastic.

FIG. 2 shows a view of thermometer 1 and thermometer holder 2 that is rotated by 90° around a vertical axis compared to FIG. 1. In this view, the passage 8 no longer passes through the center of the foot 3. Instead, the foot 3 protrudes significantly further laterally from the neck 4 on its left side compared to the right side of the foot 3. For example, the side of the foot 3 that protrudes further laterally may comprise a support surface 9 that is inclined or flat, for example. The foot 3 can therefore protrude laterally further to one side than to the opposite side.

FIG. 3 shows the function of the support surface 9. Compared to FIGS. 1 and 2, the tip 6 is inserted through the passage 8 in the opposite direction, and into a bread dough 10. The support surface 9 now rests on the surface 5 and thus stabilizes the position of the thermometer 1. The support surface can be inclined in such a way that the thermometer 1 forms an angle α with the surface 5, which may be 30°-60°. The support surface 9 can then make full surface contact with the surface 5. Because the foot 3 protrudes relatively far from the neck 4 in the direction of the support surface 9, the thermometer 1 can be inserted from an upper position into a food, such as a bread dough 10. Initially, a bread dough 10 is not firm enough to hold a thermometer 1 reliably. As shown in FIG. 3, the thermometer holder 2 can sufficiently stabilize the position of a thermometer 1 even in food such as bread dough 10 using the support surface 9.

FIG. 4 shows a view of the thermometer holder 2 that is rotated by approximately 70° about the aforementioned vertical axis compared to FIG. 1. In this view, the passage 8 does not pass through the center of the foot 3. However, the foot 3 protrudes less laterally towards the left side compared to the case of FIG. 2. Also, the support surface 9 is no longer visible. Instead, a passage 11 is now visible, which runs exclusively through the neck 4, through which the thermometer 1 can be inserted.

As shown in FIG. 5, one end 6 of the thermometer 1 can be inserted through the passage 11. The passage 11 is therefore a thermometer holding device for the thermometer 1. The thermometer 1 then runs almost horizontally, for example as shown, and forms an angle α of, for example, no more than 15° with a horizontal surface 5. The thermometer 1 can then be relatively close to the surface 5 from the start. The thermometer 1 can then be pierced laterally into a food 10. The thermometer 1 now requires no further support in order to maintain the position shown, because the thermometer is essentially horizontal. The thermometer 1 is in a position that is suitable for directly measuring the temperature of relatively thin food 10, regardless of its consistency.

FIG. 6 shows a top view of the thermometer holder 2. The foot 3 protrudes from the neck 4 so far that a finger can be placed on the foot 3 to the left and right of the neck 4, respectively. The thermometer holder 2 can thus be gripped easily, for example to easily pull a thermometer 1 out of a food 10. The foot 3 may be provided with a slit 12, which has an open end at the support surface 9. The other end of the slit 12 may have a widening 13. Slit 12 and widening 13 can be L-shaped as shown. As a result, the right-hand leg shown in FIG. 6 next to the slit 12 can be bent elastically more easily than the leg shown on the left if the thermometer holder 2 consists of an elastically flexible material. A vessel wall 14 shown in FIG. 7 can then be inserted into the slit in such a way that the thermometer holder is attached to the vessel by a clamping effect. The clamping effect is supported by the widening 13, as this makes it easier to spread the legs. The thermometer holder 2 can be connected to the vessel wall 14 in a non-slip manner by a clamping effect. A thermometer 1 may then have been inserted through the passage 11 in such a way that the thermometer 1 extends into the vessel comprising the vessel wall 14. FIG. 7 illustrates that the thermometer 1 can then form an angle of approximately 40° to 50° with the inner wall 14. A temperature in the upper area of the vessel with the vessel wall 14 can now be measured.

FIG. 8 shows a second, three-dimensional configuration of a thermometer holder 2 and a thermometer 1 held by the thermometer holder 2. The situation shown in FIG. 8 corresponds to the situation in FIG. 3. A comparison of FIG. 8 with FIG. 3 illustrates that the thermometer 1 can also be inserted almost horizontally, for example into a piece of meat 10. The end with the slit 12 of foot 3 can still be placed on a surface for stabilization. No support surface is required for this. It may be sufficient to set up the ends of the two legs, which are separated from each other by the slit 12, as indicated in FIG. 8. Since the two ends are at a distance from each other, they can stabilize the position of the thermometer 1 well.

FIG. 9 schematically shows a side view of a third configuration of a thermometer holder 2 for holding a thermometer 1. The thermometer holder 2, consisting for example of an elastomer, may again comprise a foot 3 and a neck 4. If the foot 3 stands on a horizontal surface 5, then the neck 4 protrudes upwards from the foot 3, preferably vertically. Viewed from above, the foot 3 may be circular. Seen from above, the foot 3 may be polygonal. Seen from above, the foot 3 may be square, for example.

In the third configuration, the maximum width and/or, if applicable, the diameter of the foot 3 can also be greater than the height of the thermometer holder 2. Seen from the neck 4, the foot 3 can also protrude equally far to the left and to the right in this third configuration. The neck 4 can therefore be arranged centrally on the foot 3. There may be a passage 8, indicated by dashed lines, which may pass through the center of the foot 3 in the view shown in FIG. 9. The diameter of the passage 8 can be such that the handle 7 of a thermometer 1 cannot be pushed through the passage 8 or cannot be pushed through it completely. An end 6 of a thermometer 1 which is pointed, for example, can be inserted into the passage 8 and also pushed through it. The handle 7 can then serve as a stop to prevent the thermometer 1 from being pushed completely through the passage 8.

As shown in FIG. 9, a passage 11 may pass through the neck 4. An end 6 of a thermometer 1 which is pointed, for example, can be inserted through the passage 11. Subsequently, the thermometer 1 can be held horizontally or at least approximately horizontally by the thermometer holder 2 when the thermometer holder 2 is set up as shown in FIG. 9. The handle 7 of a thermometer 1 can then again serve as a stop, which can prevent a thermometer 1 from being pushed completely through the passage 11.

A passage 15 can pass through the foot 3, which also serves as a holding device for a thermometer 1. This holding device 15 is intended to hold a thermometer 1 in particular when the slit 12 is connected to a vessel wall. An end 6 of a thermometer 1 which is pointed, for example, can be inserted through the passage 15. The handle 7 can then serve as a stop to prevent the thermometer 1 from being pushed completely through the passage 15.

The third configuration of the thermometer holder 2 may comprise a slit 12. The slit 12 again serves to attach the thermometer holder 2 to a vessel wall. As shown in FIG. 9, the slit 12 can lead into the neck 4 from above. The slit 12 then comprises an open end at the upper side of the neck 4.

The slit 12 may have a passage 16 close to its entry opening 17. The diameter of the passage 16 can be smaller than the diameter of the other three passages 8, 11 and 15. If a tip or a pointed end 6 of a thermometer 1 is pushed into the passage 16, the two legs of the slit 12 are bent apart. A thermometer 1 is then held clamped. The passage 16 then acts like a clip together with the legs of the slit 12. Alternatively, a thermometer 1 can be pushed through the inlet opening 17 from above until the thermometer 1 is held in the area of the passage 16 in a clip-like manner.

The passages 11 and/or 16 may be inclined in such a way that a thermometer 1 is not held horizontally by the respective passage 11, 16, but runs at an angle in the direction of the surface. This is the case when the thermometer holder 2 is set up as shown in FIG. 9. The passages 11 and/or 16 may run horizontally when the thermometer holder 2 is set down on a horizontal surface. Thus, the passages 11 and/or 16 may then run parallel to the surface.

The slit 12 may have an outwardly widening inlet opening 17, for example to facilitate pushing into a vessel wall into the slit 12.

The passage 11 may fulfill a dual function if, as shown in FIG. 9, it serves as a circular widening 13 for the slit 12. The passage 11 then forms a widened base of the slit 12.

FIG. 10 shows the thermometer holder 2 of FIG. 9. The thermometer holder 2 is set up with its foot 3 on a horizontal surface 5. A thermometer 1 is inserted with its tip 6, i.e., its pointed end, into the passage 8. The surface 5 prevents the tip 6 from being pierced through the passage 8. The thermometer 1 extends vertically upwards. The thermometer 1 is in a parked position. In the parked position, it can be stored together with the thermometer holder 2 in a cabinet in a space-saving manner. Together with the thermometer holder 2, the thermometer 1 can be placed close to a hob in a space-saving manner and in this way, together with the thermometer holder 2, it is ready to hand during a cooking process.

FIG. 11 shows the thermometer holder 2 of FIGS. 9 and 10. In comparison to FIG. 10, the tip 6 of the thermometer 1 has first been inserted into the passage 8 in the opposite direction. The tip 6 and thus the thermometer 1 has then been inserted further through the passage 8, namely up to the handle 7. Since the handle 7 widens conically towards the end, it acts as a stop and can be held frictionally in the passage 8. The thermometer holder 2 now also serves as a thermally insulating handle for the thermometer 1 if the thermometer holder 2 consists of a thermally insulating material such as plastic. The plastic is preferably elastic so that the handle 7 can be partially pushed into the passage 8 in such a way that the handle 7 is held in the passage 8 in a force-fit manner. Alternatively or additionally, the handle 7 may consist of an elastic material so that a frictional connection to a passage can be produced. In particular, the foot 3 of the thermometer holder 2 can be gripped with fingers of one hand and can therefore be used to easily pull the thermometer 1 out of a food.

FIG. 12 shows the thermometer holder 2 of FIGS. 9 to 11, which is attached to a vessel wall 14 shown in section. The vessel wall 14 is pushed into the slot 12 of the thermometer holder 2. The tip 6 of the thermometer 1 has been inserted through the passage 15 in the foot 3 of the thermometer holder 2. The widened handle 7 of the thermometer 1 prevents the thermometer 1 from slipping through the passage 15. The tip 6 now extends into the vessel with the vessel wall 14. The thermometer 1 can therefore measure the internal temperature in a cooking vessel or food preparation vessel with the vessel wall 14. The thermometer 1 can also reach into a food that is in the cooking vessel or food preparation vessel with the vessel wall 14.

FIG. 13 shows a temperature measurement of a food 10 by means of a thermometer 1 and a thermometer holder 2. In contrast to the thermometer holders 2 shown in FIGS. 9 to 12, the thermometer holder 2 shown in FIG. 13 has a support surface 9 running in a straight line on the side. If the tip 6 of the thermometer 1 is inserted through the passage 8 and inserted into a food 10, the thermometer holder 2 can be supported on the support surface 9. Supporting the thermometer holder 2 on the support surface 9 stabilizes the position of the thermometer 1 during the temperature measurement, as the preferably rectilinear course of the support surface 9 can rest in a straight line on a surface. However, the support surface 9 can also be concave, for example. The two ends of the concave curvature can then rest on a surface and thus stabilize the position of the thermometer 1.

FIG. 14 schematically shows a top view of the thermometer holder 2 of FIG. 13. FIG. 14 illustrates that the foot 3 is not circular when viewed from above because there is a support surface 9 running in a straight line at the side. The support surface 9 causes a deviation from a circular shape. The support surface 9 does not have to be flat in order to have a stabilizing effect. For stabilization, it is only important that the support surface 9 runs in a straight line when viewed from above, as shown in FIG. 14. Otherwise, the support surface 9 can, for example, be uniformly arc-shaped, as is the case with a cylinder.

FIG. 15 schematically shows the thermometer holder 2 and the thermometer 1 of FIGS. 13 and 14. The tip 6 of the thermometer 1 is inserted through the passage 11 and pierced into a food 10.

The system shown in FIG. 16 comprises a container 18. The container 18 may be cylindrical in shape. The container 18 may be closed at one end face, as shown on the upper side in FIG. 16. The thermometer holder 2 can be adapted to the container opening in such a way that the thermometer holder 2 can be a sealing cap for the container 18. The thermometer 1 can then be in the container 18. The container 18 can thus protect the thermometer 1 housed in the container 18 from external influences. The system with the container 18 can be accommodated in a space-saving and protected manner.

The container 18 may comprise an inductive charging device via which the rechargeable battery of the thermometer 1 can be inductively charged. In one embodiment, the container 18 can therefore inductively charge the rechargeable battery of the thermometer 1. In this case, the container 18 comprises charging electronics configured for inductive charging. In one embodiment, the container 18 may comprise a battery, for example to be able to charge the rechargeable battery of the thermometer 1. Alternatively or additionally, a battery of the container 18 can serve to supply its own electronics with power. In one embodiment, the container 18 can be connected to an external power source in order to be able to charge the rechargeable battery of the thermometer 1 and/or, if applicable, the rechargeable battery of the container 18. In one embodiment, the battery can be removed from the container 18, for example in order to be able to charge the battery afterwards. The battery of the thermometer 1 can also be accommodated in such a way that it can be easily replaced.

In one embodiment, the container 18 may comprise a wireless transmitter and/or receiver unit to be able to wirelessly transmit data to the thermometer 1 and/or to be able to wirelessly receive data from the thermometer 1. In one embodiment, the container 18 may comprise a display on which a measured temperature of the thermometer 1 can be displayed. A wireless transmitter and/or receiver unit of the container 18 can be configured such that it can only receive data from the thermometer 1 over short distances and can send this data over longer distances to an external control device, such as a food processor. In this way, the container 18 can exchange data with the thermometer 1 via Bluetooth, for example, or at least receive data from the thermometer. The container 18 can then exchange data with a food processor via Wi-Fi, for example. The container 18 can thus serve as an interface to minimize the energy consumption of the thermometer 1 during operation. The food processor can then be configured such that a food preparation appliance in which the thermometer 1 measures temperatures is controlled via the food processor. However, the container 18 can also receive and send data only via Bluetooth or only via Wi-Fi, for example, in order to be able to be an interface. The container 18 may have a computing device to perform computing tasks and thus relieve the thermometer of computing tasks. It is advantageous to use the container 18 for computing tasks and not the thermometer 1 in order to minimize the energy consumption of the thermometer 1. For example, the container 18 can easily have its own comparatively large battery and/or can easily be connected to an external power source.

Other configurations of a thermometer holder 2 are also possible. For example, another embodiment may differ from the third configuration shown in FIG. 9 because the passage 16 passing through the neck 4 is not present.

In addition to passage 15 and passage 8, there may be a third passage that leads through foot 3. For reasons of space, it is then advantageous for the passage 15 and the third passage to be arranged so that the passage 8 shown in FIG. 14 is located between the other two passages. The three passages can therefore be arranged along a straight line.

With three passages passing through the foot 3, it is expedient for reasons of space that the passage 15 is not arranged opposite the support surface 9 at the outer circumference as shown in FIG. 14. Instead, it is advantageous that the three passages are arranged along an imaginary straight line that runs parallel to the support surface 9 shown in FIG. 14. The passage 15 is then located, for example, to the left of the passage 8 shown in FIG. 14 and the third passage to the right of the passage 8 shown in FIG. 14.

More than three passages can also pass through the foot 3, for example four passages. There can only be two passages on the outer circumference of the foot. Between the two outer passages there may be a blind hole into which the thermometer can be inserted. The blind hole may end at the base of the foot and serve to allow the thermometer 1 to be positioned vertically, as shown in FIGS. 1, 2 and 10, when the installation area of the foot 3 is placed on a flat surface. The thermometer 1 cannot then be pushed through the foot 3 because the blind hole is closed at the foot 3.

The slit 12 shown in FIG. 14 does not have to run from right to left and thus parallel to the support surface 9. Instead, it may be expedient for the slit 12 shown in FIG. 14 to run from top to bottom and thus perpendicular to the support surface 9 shown in FIG. 14. This course of the slit 12 is preferable, for example, if there are three passages as described above, which are arranged along the aforementioned imaginary straight line. Instead of three passages, there may be two passages and a blind hole arranged along a line.

If, in addition to the passage 8 shown in FIG. 14 or in addition to the blind hole that replaces the passage 8, there are two further passages, i.e., the passage 15 and a third passage, then it is advantageous that the three passages can hold a thermometer 1 in three different ways. If a thermometer 1 is held by the middle passage 8, then the thermometer 1 extends parallel to the direction of extension of the neck 4, for example, as shown in FIG. 13, and thus perpendicular to the installation area of the foot 3. If a thermometer 1 is held by the second passage 15, then the thermometer 1 forms a first acute angle with the direction of extension of the neck 4, for example, and thus deviates from what is shown in FIG. 12. The thermometer 1 then does not run parallel to the direction in which the neck 4 extends, as shown in FIG. 12. If a thermometer 1 is held by the third passage, then the thermometer 1 forms, for example, a second acute angle with the direction in which the neck 4 extends. The second acute angle is then, for example, greater than the first acute angle.

Only one passage may pass through the foot and there may also be a blind hole for an at least essentially vertical setting up. The passage is then preferably aligned in such a way that the thermometer does not run through the passage perpendicular to the installation area of the foot 3.

FIG. 14 shows passages with a round cross-section. However, it is also possible for one or more passages to have an angular cross-section. For example, all three passages mentioned may have a square cross-section. This is particularly preferable if the handle 7 also has a square cross-section so that the handle can be held in a rotationally fixed manner through each passage, preferably in a clamping manner. Apart from this, the thermometer 1 may also have a different cross-section, for example a circular cross-section.

The cross-section of the handle 7 expands towards the adjacent end of the thermometer 1, preferably continuously, so that the handle 7 can only be partially inserted into a passage. The passage 15 and/or the said third passage can be such that a thermometer 1 which has been inserted into one of the two passages can be pivoted by more than 5°, preferably by more than 10°, and such a pivoting movement is no longer possible when the handle 7 has been inserted into a said passage in the maximum possible manner. To achieve this, a passage may have a square or circular cross-section on one side, for example, which becomes increasingly elongated towards the other side. For example, the cross-section of the passage on the other side can then be rectangular or a differently shaped elongated hole. This further increases the possible applications.

The thermometer holder 2 and/or the handle 7 may consist of a temperature-resistant plastic. Preferably, the plastic is selected so that it can be exposed to the usual maximum oven temperatures of up to at least 200° C. or up to at least 220° C.

FIG. 17 shows a foot 3 of another thermometer holder 2 from the base. The base of the foot 3 is predominantly circular. However, it has a straight edge 25. This shape of the base of the foot 3 is adapted to the shape of an end face of a container shown in the following. Like the support surface 9, the edge 25 can be used for support. Two passages 15 and 24 pass through the Foot 3. A thermometer 1 can be inserted (pierced) through each passage 15, 24. After piercing, the thermometer 1 forms an angle with the base of the foot 3 that is less than 90°. The size of the angle depends on which of the two passages 15, 24 the thermometer 1 has been inserted through. If the thermometer 1 is inserted through the passage 24, for example, the angle is larger compared to the case where the thermometer 1 has been inserted through the passage 15.

The two passages 15, 24 can be arranged off-center, as shown in FIG. 17.

FIG. 18 shows the other thermometer holder 2 of FIG. 17 from the upper side. There may be a passage 11, for example close to the foot 3, which passes through the neck 4. A slit 12 passing through the neck 4 may open into the passage 11. The passage 11 can be used for inserting and holding a thermometer 1. The passage 11 can also be used to grip around a web, shown below, in a recess of a container, shown below, in order to be able to hold the thermometer holder 2 in the recess in a form-fitting manner. There may be a blind hole 26 into which the thermometer 1 can be inserted for storage. The blind hole 26 can lead into the neck 4 from above. The blind hole 26 may have a square cross-section or an approximately square cross-section with slight curves. The square cross-section with slight curves may serve to make it particularly easy to insert a square cross-section of the handle 7 into the blind hole 26. So that the handle 7 can be easily inserted into the blind hole 26 and still be held in a clamping manner, the maximum width of the blind hole 26 may be slightly greater than the maximum width or side length of the handle 7. For example, the maximum side length of the handle 7 can be seven millimeters. The maximum width of the blind hole 26 can then be more than seven millimeters and can, for example, be a maximum of 9 mm or a maximum of 8 mm. The cross-section of the blind hole 26 can then be slightly rounded so that the handle 7 can be held clamped in the blind hole 26. Alternatively or additionally, the cross-section of the blind hole 26 can decrease in the direction of the foot 3. If the handle 7 is inserted into the blind hole 26, the thermometer 1 can be held clamped due to the decreasing cross-section. If the handle 7 is inserted into the blind hole, the combination of thermometer holder 2 and thermometer 1 can be used to force the thermometer 1 into a piece of meat, for example. Through the thermometer holder 2, pressure points in a hand can then be avoided.

The two passages 15 and 24 may have a rectangular cross-section, as shown in FIGS. 17 and 18. The thermometer 1 or at least its casing 20 may have a circular cross-section. If the thermometer holder 2 consists of a flexible material and if the cross-section of the thermometer 1 is slightly larger than a narrow side of the rectangular cross-section, the thermometer 1 inserted into a passage 15, 24 can be held in a force-fit manner. The rectangular shape, which differs from the circular cross-section, makes it possible for the thermometer 1 to be easily inserted into a passage 15, 24 and also easily pulled out again without great force. The reason for this is that the thermometer 1 then only rests against two points and therefore no great frictional forces have to be overcome in order to insert the thermometer 1 and pull it out again.

The two passages 15 and 24 may also have a cross-section that deviates from the rectangular shape in order to achieve this advantage. The cross-section deviating from the rectangular shape should then be such that the thermometer 1 rests against it at only a few points, for example at a maximum of four points.

The two passages 15 and 24 may have a square cross-section. The thermometer 1 or at least its casing 20 may have a circular cross-section. The thermometer 1 is then in contact at four points and not just at two points as with the rectangle, if the diameter of the thermometer 1 is slightly larger than the sides of the rectangle. In turn, the thermometer 1 cannot slip sideways. For example, the casing 20 may have a diameter of 6 mm. The length of the sides of the square cross-section are then less than 6 mm. The length of the sides of the square cross-section is then preferably at least 5 mm or at least 5.5 mm. The length of the sides of the square cross-section is, for example, 5.4 mm to 5.8 mm.

It should be avoided that the entire outer circumference of the thermometer 1 rests against the entire inner circumference of a passage 14, 24 with pressure in order to avoid unnecessarily high frictional forces. It is therefore also possible for a passage 15, 24 to have a square cross-section and the thermometer 1 to have a circular cross-section. The circular cross-section can then be in contact at four points. Although this case is somewhat less favorable in terms of the force required compared to the case of the rectangular cross-section, it is better than contact over the entire circumference. The advantage of this can be that a desired position can be maintained particularly reliably.

A passage does not have to be exactly square for this advantage to be achieved. It may be sufficient for a passage 15, 24 to be only approximately square to such an extent that the circular cross-section of the thermometer 1 is in contact at only four points when the thermometer has been inserted into the passage 15, 24.

The passage 15, 24 may be triangular or approximately triangular in section. The thermometer 1 inserted into the passage 15, 24 can then rest against only three points.

The diameter of the thermometer 1 may have a cross-section that differs from a circle. For example, the cross-section can be oval or angular. Nevertheless, it is possible that the thermometer 1 then only rests against a few points so that the thermometer 1 can be easily pulled out of and inserted into a passage 15, 24. The thermometer 1 can be inserted particularly easily if it has a tip 6. However, a circular cross-section of the thermometer 1 has the advantage that it is not necessary to pay attention to orientation when the thermometer 1 is inserted into a passage 15, 24.

If the shape of the cross-section of the thermometer 1 changes over its length, then it is sufficient that at least one cross-sectional shape is present on the thermometer 1 which, as described, does not rest against the inner circumference of a passage 15, 24 over the entire outer circumference. It may therefore be sufficient, for example, for only one of the previously described casings 20 of the thermometer 1 to have a cross-section that cannot rest against the entire circumference.

For similar reasons, the cross-section of the blind hole 26 can have a shape that differs from the cross-section of the thermometer 1.

The blind hole 26 may be provided only to be able to park the thermometer 1 (set it down), similar to what is shown in FIG. 2. In this case, the shape and dimension of the cross-section of the blind hole 26 can be selected such that the thermometer 1 or at least its casing 20 can be inserted into the blind hole 26 with clearance. The thermometer 1 can then be set down particularly quickly and easily. The cross-section of the blind hole 26 can, for example, be square or at least approximately square. The cross-section of the thermometer 1 can be circular, for example, so that it can be inserted particularly easily into the blind hole 26 with clearance. The cross-section of the thermometer 1 can also change in this case. For example, a casing 20 of the thermometer 1 can have a circular cross-section. The handle 7 can have a different cross-section. The cross-section of the handle 7 adjacent to the casing 20 can also initially be circular like the cross-section of the casing 20. This initially circular cross-section can then change (transition) into a square cross-section, for example. The square cross-section can then widen in the direction of end piece 19. The circular cross-section may have a diameter of 5 to 7 mm, for example 6 mm. The maximum square cross-section may then have a side length that can be one to two millimeters greater than the circular cross-section. If the diameter of the circular cross-section is 6 mm, for example, the maximum side length of the square cross-section can be 7 mm. The end piece 19 can then also have a square diameter with a side length of 6 mm. The sides of the end piece 19 can then run parallel to the sides of the square cross-section of the handle 7.

FIG. 19 shows another container 18 for storing a thermometer 1. The container 18 is pivotably connected to a lid 27. An open position of the lid 27 is shown. The container 18 can be closed by the lid 27 by pivoting the lid 27 downwards.

A holding device for holding the thermometer 1 on the lid 27 can be attached to the inside of the lid 27. The holding device may comprise a plurality of clips 28, as shown. The clips 28 may be such that the thermometer 1 can be pushed into the clips 28 and/or that the thermometer 1 can be pushed into the clips 28 parallel to the lid 27. The clips 28 can be shaped in such a way that the thermometer 1 can only be pulled out of the clips 28 parallel to the lid 27. If the thermometer 1 shown in FIG. 19 is moved parallel to the lid 27 in the direction of the lower end of the lid 27, the lid 27 can finally be closed. The lid 27 may have been produced from plastic together with the clips 28 in a single step, for example by injection molding.

In the container 18, there may be a clip 29 and/or there may be a spring element 30 at one end of the container interior as loading contacts. Only one leg of the clip 29 is visible, as the opposite leg is covered by the front side wall of the container 18. The spring element 30 is bent outwards to the right in the shape of a ramp on its upper side to facilitate connection to the end piece 19 of the thermometer 1. The two charging contacts 29, 30 consist of an electrically conductive material such as metal.

When the lid 27 is closed with the thermometer 1 held by the holding device 28, the clip 29 clips around the casing 20 of the thermometer 1. The spring element 30 is biased to the right by the end piece 19 due to its upper ramp shape. The rechargeable battery of thermometer 1 can now be charged.

The container 1 may have a cable connection with an electrical plug 31 in order to be able to connect the container 18 to an external power source.

FIG. 20 shows an end face of the container 18 of FIG. 19. The end face comprises a recess 32 into which the neck 4 of the thermometer holder 2 shown in FIGS. 17 and 18 can be inserted. The circumferential side wall of the recess 32 may comprise inwardly protruding ribs 33. The ribs 33 can hold the neck 4 in a force-fit manner. Nevertheless, the neck can be inserted into the recess 32 without any problems, because the entire outer circumference of the neck 4 does not have to lie force-fit against the inner circumference of the recess 32 for force-fit retention.

The cross-section of the recess 32 may taper towards the base and thus be advantageously adapted to a conical shape of the neck 4.

The ribs 33 preferably extend from the end face of the container 18 towards the base of the recess 32, as shown in FIG. 20. This further facilitates the insertion of the neck 4 into the recess 32.

A web 34 or a plate 34 may be present in the recess 32. The web 34 may extend from one side of the recess 32 to an opposite side of the recess and be attached to these sides. This may also apply to a plate 34.

The web 34 can be embraced by the slit 12 of the neck 4.

The web 34 may be arranged in such a way that the web 34 can be located within the slit 12 of the neck 4 in order to be able to insert the neck 4 into the recess 32. This ensures that the neck 4 can be aligned for insertion. This may also apply to a plate 34.

The web 34 can be widened in the central area so that its shape is adapted to the shape of the slit 12 plus the cross-sectional shape of the blind hole 26. This can further stabilize the hold in the recess 32 in an improved manner. If a plate 34 is provided that extends from one side to an opposite side of the recess 32, the plate 34 can also ensure orientation. In contrast to the web 34, there is no undercut when the plate 34 is connected to the base of the recess 32. This facilitates one-piece production of the recess 32 together with the ribs 33 and the plate 34, for example by plastic injection molding. This means that it is not necessary to join together several parts. The slit 12 of the thermometer holder 2 can be somewhat narrower than the thickness of the plate 34 so that the thermometer holder 2 can be held in the recess 32 by a clamping effect. The plate 34 can be 3 mm thick, for example. The width of the slit 12 can then be less than 3 mm and be at least 2 mm or at least 2.5 mm wide, for example.

So that the plate 34 can be easily threaded into the slit 12, the slit 12 can be slightly widened on its upper side of the neck 4. Alternatively or additionally, the width of the slit can taper slightly in the direction of foot 3 or in the direction of a passage 11 in order to be held in a clamping manner.

The container 18 may have a flat base 35 for parking the container 18 (setting it down). If the slit 12 of the neck 4 forms a right angle with the edge 25 of the thermometer holder 2, as shown in FIGS. 17 and 18, then the web or plate 34 can also form a right angle with the base 35. This can be achieved by the edge 25 being adjacent to the base 35 and parallel to the base 35 when the neck 4 is inserted into the recess 32. The inserted thermometer holder 2 then does not interfere with placing the container 18 on a surface.

The maximum diameter of the container 18 can be 38 to 42 mm, for example. The maximum diameter of the foot 3 is then also 38 to 42 mm. The maximum diameter of foot 3 can therefore be the same as the maximum diameter of foot 3.

If the neck 4 has been pushed as far as possible into the recess 32, then in one configuration the passage 11 can engage around the web 34 in such a way that the thermometer holder 2 is held in a form-fitting manner. The web 34 is then arranged at the height of the passage 11. However, the web 34 can also be provided for only one orientation and arranged at a suitable height for this purpose. The web 34 can then not be arranged at the level of the passage 11 when the thermometer holder 2 is inserted into the recess 32. If the web 34 is only provided for one orientation, then the web 34 can, for example, be arranged close to the base of the recess 32 when the passage 11 is arranged close to the foot 3.

FIG. 21 shows the inserted state of the thermometer holder 2. The edge 25 of the thermometer holder 2 is aligned parallel to the container base 35 and is adjacent to the container base 35. The container 18 can therefore also be set down without interference when the thermometer holder 2 is inserted into the recess 32.

FIG. 22 shows a top view of a container 18 as described above, with the lid 27 removed. It is sketched how a thermometer 1 is arranged in the container 18. The tip 6 of the thermometer extends into a pointed recess 36 in the interior of the container 18. The end piece 19 of the thermometer 1 lies against the spring 30, which is then pretensioned and can press the thermometer in the direction of the pointed recess 36. The clip 29 rests on the casing 20 of the thermometer 1.

FIG. 23 shows a section through the container 18, which shows the clip 29 resting against the thermometer 1. In FIG. 24, a sectional view of the container 18 is shown, which outlines the holding of the thermometer 1 by the holding device 28.

In FIG. 25, another configuration of a container 18 is shown in section. A wall 37 may protrude downwards from the lid 27. The wall 37 may comprise an opening 38 as a slot (insert). The opening 38 may be circular. The diameter of the opening 38 can be such that the casing 20 of the thermometer 1 can be pushed into the opening 38 with little play. The opening 38 is then a holding device of the lid 27 or at least part of a holding device of the lid 27 in order to be able to hold the thermometer 1 on the lid. If the lid 27 has been closed, the thermometer 1 in the container can then be held through the opening 38.

There may be several walls 37 with openings 38 through which the thermometer 1 can be inserted for holding on the lid. The openings 38 are then a holding device of the lid 27 or at least part of a holding device of the lid 27. Once the lid 27 has been closed, the thermometer 1 in the container 18 can be held through the openings 38.

One or more of the openings 38 can be dimensioned in such a way that a handle 7 of the thermometer 1 cannot be inserted through them.

FIG. 26 shows another configuration of a container 18 in section. A wall 39 can protrude downwards from the lid 27. The wall 39 may comprise an opening 40 as a slot. The opening 40 may be square or approximately square as shown. The diameter of the opening 40 may be such that a casing 20 of the thermometer 1 can be inserted through the opening 40 with significant clearance. The casing 20 may have a circular diameter as shown.

The opening 40 may be dimensioned so that a handle 7 of the thermometer 1 can be inserted into the opening 40. The opening 40 may be dimensioned in such a way that the handle 7 of the thermometer 1 is held in the opening 40 without play when the thermometer 1 has been pushed through the opening 40 as far as possible. The handle 7 can initially have a circular diameter like the casing 20. The circular diameter can change to a square diameter or an approximately square diameter. It can thus be achieved that the thermometer is forcibly rotated about its longitudinal axis as required and aligned in this way when the handle 7 is pushed into the opening 40 as far as possible. The opening 40 can then form a holding device of the lid 27. If the lid 27 is closed and the thermometer 1 is then in the container 18, the handle 7 can be located within the opening 40. A spring 30, as shown in FIG. 22, may then have pressed the handle 7 as far as possible into the opening 40. The handle 7 can then be held without play, as shown in FIG. 27.

In addition to the wall 39, there may be one or more walls 37 with openings 38 of FIG. 25, through which the thermometer 1 can be inserted for holding on the lid. The openings 38 and 40 then form a holding device of the lid 27 or are at least part of a holding device.

FIG. 28 shows a top view of a configuration of a container 18. The lid 27 of the container 18 may consist of a transparent material. A thermometer 1 located in the container 18 may then be visible through the lid 27. There may be two bearing points 41 close to a first end face end of the elongated lid 16, through which the lid 27 is pivotably supported. The bearing points 41 may be arranged in the interior or adjacent to the interior of the container 18. A recessed grip 42 may be provided at an opposite second end face end of the elongate lid 16. The recessed grip 42 makes it possible to grasp and lift the lid 16 with a finger.

The two walls 37 and 39 may be end walls of an oval. The two walls 37 and 39 can thus be mechanically stabilized. A tab with a hook-shaped end 44 can be cut into the side walls 43 of the oval, which extend in a straight line, for example, as shown in a side view in FIG. 29. The hook-shaped end 44 can engage in a latching recess provided for this purpose on a side wall of the interior of the container 18 in order to be able to hold the lid 27 in a closed position. The hook-shaped end 44 can be released again by lifting the lid 27 with sufficient force. Hook-shaped end means that something protrudes from the side of the flap, which can engage in a latching recess. Instead of a hook-shaped end 44, a differently shaped latching element, such as a latching recess, can also be provided, which can latch releasably with a corresponding latching element at a side wall of the interior of the container 18.

For example, adjacent to the tab with the hook-shaped end 44, there may be a recess 45 in the side walls 43 of the oval. The recesses may be dimensioned such that a held thermometer 1 can be reached with a finger, for example for rotating and aligning the thermometer 1. The recesses may be arranged opposite each other.

An oval recess may be provided in the base of the container 18, into which the oval with the walls 37, 39, 43 can extend with little play when the lid 27 is closed. The oval recess can contribute to stabilization and orientation.

In FIG. 30, the container 18 is shown with a view of the flat base 35, namely in the vertically set up state of the container 18. The container 18 is placed on the foot 3 of the thermometer holder. The material of which the container 18 consists may be stiff compared to the material of which the foot 3 consists. The foot 3 may consist of an elastomer, for example, so that the container 18 can be set up vertically in a noise-insulated manner. The material of the container 18 is then less flexible and may be a hard plastic material, for example. The material of the foot 3 may provide slip resistance and can also consist of an elastomer for this reason, for example.

The container 18 may have a battery compartment with a lid 46 on its base 35, for example, in order to be able to insert a commercially available battery, for example, into the battery compartment. The battery may be a AAA or AA battery. The battery can be used to charge the thermometer 1. A recessed grip 47 can adjoin an end face of the battery compartment lid 46 in order to be able to lift the battery compartment lid 46. The battery compartment lid 46 may have a latching element 48 on the end face in order to be able to fasten the battery compartment lid 46. Thanks to the recessed grip 47, for example, the latching element 48 can be pushed back for opening.

The container 18 may have one or more magnets 49 on its base, for example, in order to be able to attach the container 18 magnetically to a wall.

The invention claimed is:

1. A system comprising a thermometer, a rechargeable battery in the thermometer, a container for the thermometer, and a lid for closing the container, wherein the container comprises a charging device for charging the rechargeable battery, and wherein the lid comprises a holding device for holding the thermometer and, configured such that upon closing the lid, the thermometer is connected to the charging device for charging the battery when the thermometer is held by the lid.

2. The system of claim 1, wherein the charging device comprises a latching device as a charging contact, into which the thermometer latches when the thermometer is charged in the container.

3. The system of claim 2, wherein the latching device comprises a clip as a charging contact.

4. The system of claim 2, wherein the charging device comprises a spring as charging contact.

5. The system of claim 4, wherein the spring rests against an end face of the thermometer when the thermometer is charged in the container.

6. The system of claim 1, wherein the charging device comprises a spring as charging contact.

7. The system of claim 6, wherein the spring rests against an end face of the thermometer when the thermometer is charged in the container.

8. The system of claim 1, wherein the thermometer is pin-shaped and comprises a casing consisting of metal, which is electrically separated from an end piece consisting of metal from the casing by a handle part, wherein the casing and the end piece are charging contacts for charging the rechargeable battery of the thermometer.

9. The system of claim 8, wherein the holding device of the lid comprises a slot into which the thermometer can be pushed for holding the thermometer.

10. The system of claim 9, wherein the slot is aligned such that the thermometer can be pushed into the slot parallel to the lid.

11. The system of claim 9, wherein the system comprises a thermometer holder consisting of an elastomer or other plastic for holding the thermometer and the thermometer holder can be held by the container.

12. The system of claim 11, wherein the container comprises a recess at an end face, into which the thermometer holder can be inserted, wherein a plate is present in the end face, which can be located in a slit of the thermometer holder when the thermometer holder is inserted into the recess.

13. The system of claim 1, wherein the holding device of the lid comprises a slot into which the thermometer can be pushed for holding the thermometer.

14. The system of claim 13, wherein the slot is aligned such that the thermometer can be pushed into the slot parallel to the lid.

15. The system of claim 1, wherein the thermometer comprises a tip (6) and the container comprises a recess adapted to the tip into which the thermometer extends when the thermometer is in the container.

16. The system of claim 1, wherein the lid is pivotably connected to the container.

17. The system of claim 1, wherein the length of the lid corresponds to the length of the thermometer.

18. The system of claim 1, wherein the container has a flat underside (35) which is opposite the lid.

19. The system of claim 1, wherein the system comprises a thermometer holder consisting of an elastomer or other plastic for holding the thermometer and the thermometer holder can be held by the container.

20. The system of claim 19, wherein the container comprises a recess at an end face, into which the thermometer holder can be inserted, wherein a plate is present in the end face, which can be located in a slit of the thermometer holder when the thermometer holder is inserted into the recess.

* * * * *